US010637977B1

(12) United States Patent
Wang et al.

(10) Patent No.: US 10,637,977 B1
(45) Date of Patent: Apr. 28, 2020

(54) ILLUMINATION SYSTEMS FOR ITEMS WITH LEATHER

(71) Applicant: Apple Inc., Cupertino, CA (US)

(72) Inventors: Paul X. Wang, Cupertino, CA (US); Whitney D. Mattson, Menlo Park, CA (US); Christopher T. Lebedeff, Santa Clara, CA (US); Craig C. Leong, San Jose, CA (US); James C. Whitley, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 15/685,826

(22) Filed: Aug. 24, 2017

Related U.S. Application Data

(60) Provisional application No. 62/382,161, filed on Aug. 31, 2016.

(51) Int. Cl.
| | | |
|---|---|---|
| *H04M 1/02* | (2006.01) | |
| *G09F 13/04* | (2006.01) | |
| *H04B 1/3888* | (2015.01) | |
| *H04M 1/18* | (2006.01) | |

(52) U.S. Cl.
CPC ........ *H04M 1/0249* (2013.01); *H04B 1/3888* (2013.01); *H04M 1/0264* (2013.01); *H04M 1/0283* (2013.01); *H04M 1/185* (2013.01)

(58) Field of Classification Search
CPC ............. H04M 1/0249; H04M 1/3888; H04M 1/10264; H04M 1/0283; H04M 1/185
See application file for complete search history.

(56) References Cited

U.S. PATENT DOCUMENTS

| | | | | | |
|---|---|---|---|---|---|
| 5,572,817 | A | * | 11/1996 | Chien | F21S 8/035 40/544 |
| 5,794,366 | A | * | 8/1998 | Chien | F21S 8/035 40/540 |
| 6,652,128 | B2 | * | 11/2003 | Misaras | B60K 37/06 362/488 |
| 9,485,338 | B2 | | 11/2016 | Balaji et al. | |
| 9,793,073 | B2 | * | 10/2017 | Marwah | H01H 13/704 |
| 10,288,800 | B1 | * | 5/2019 | Keranen | G02B 6/0033 |
| 2002/0101738 | A1 | * | 8/2002 | Misaras | B60K 37/06 362/487 |
| 2009/0173605 | A1 | | 7/2009 | Liu et al. | |

(Continued)

FOREIGN PATENT DOCUMENTS

EP  2628627  4/2016

*Primary Examiner* — Anabel Ton
(74) *Attorney, Agent, or Firm* — Treyz Law Group, P.C.; Kendall W. Abbasi

(57) ABSTRACT

An item such as a leather-based item may have a layer of leather with one or more transparent portions that are illuminated by a light source. The transparent portions of the leather may be formed by a single continuous opening in the leather or may be formed by an array of smaller openings. A flexible light guide may be attached to a lower surface of the leather. The light guide may be used to add structure and heft to a thinned portion of the leather while still allowing the leather to remain flexible and soft. The light guide may be attached to a lower surface of the leather and may diffuse and guide light from a light source towards the leather. The light guide may be formed from one or more waveguide "pipes" or may be formed form a plate-light light guide layer that extends continuously under the leather.

17 Claims, 12 Drawing Sheets

(56) References Cited

U.S. PATENT DOCUMENTS

| | | | |
|---|---|---|---|
| 2009/0251917 A1* | 10/2009 | Wollner | F21S 43/239 |
| | | | 362/543 |
| 2010/0046163 A1 | 2/2010 | Yu et al. | |
| 2010/0277944 A1* | 11/2010 | Hurwitz | A41D 27/08 |
| | | | 362/570 |
| 2011/0116013 A1* | 5/2011 | Sano | G02B 6/0021 |
| | | | 349/64 |
| 2011/0122494 A1* | 5/2011 | Sherman | G02B 5/128 |
| | | | 359/530 |
| 2011/0203147 A1* | 8/2011 | Van Herpen | G08B 7/066 |
| | | | 40/541 |
| 2012/0055055 A1* | 3/2012 | Kunowski | G09F 13/04 |
| | | | 40/544 |
| 2013/0155715 A1* | 6/2013 | Kim | F21L 4/00 |
| | | | 362/553 |
| 2013/0170218 A1* | 7/2013 | Wolk | G02B 6/0065 |
| | | | 362/296.01 |
| 2014/0045558 A1 | 2/2014 | Kim | |
| 2014/0340920 A1* | 11/2014 | Bayersdorfer | B60Q 3/54 |
| | | | 362/511 |
| 2015/0234108 A1* | 8/2015 | Harley, Jr. | G06F 1/1632 |
| | | | 362/606 |
| 2016/0196936 A1 | 7/2016 | Ding et al. | |
| 2018/0251032 A1* | 9/2018 | Kang | B60K 37/06 |
| 2019/0213567 A1* | 7/2019 | Hamrock | G02B 6/0068 |

\* cited by examiner

ILLUMINATION SYSTEMS FOR ITEMS WITH LEATHER

This application claims the benefit of provisional patent application No. 62/382,161, filed Aug. 31, 2016, which is hereby incorporated by reference herein in its entirety.

FIELD

This relates generally to leather-based items, and, more particularly, to systems for providing leather-based items with illumination.

BACKGROUND

Soft and flexible materials such as leather are sometimes used in forming structures in electronic equipment. A layer of leather may, for example, be used as a case for an electronic device such as a cellular telephone or a laptop computer. Leather tends to be soft to the touch and pleasing to the eye, making it an ideal material for carrying or covering electronic equipment.

It can be challenging to incorporate leather in electronic equipment. If care is not taken, a light-based output device or other illumination system may be blocked by the leather, making it difficult to provide light-based output to a user. Some leather cases include large openings for providing access to input-output components of an electronic device. However, large openings can be unsightly and can degrade the overall look and feel of the leather.

SUMMARY

An item such as a leather-based item may have a layer of leather with one or more transparent portions that are illuminated by a light source. The transparent portions of the leather may be formed by a single continuous opening in the leather or may be formed by an array of smaller openings. Openings may be tapered or straight. Transparent portions of leather may also be formed by thinning (e.g., skiving) the leather to the point of transparency.

A flexible light guide may be attached to a lower surface of the leather. The light guide may be used to add structure and heft to a thinned portion of the leather while still allowing the leather to remain flexible and soft. The light guide may be attached to a lower surface of the leather and may diffuse and guide light from a light source towards the leather. The light guide may be formed from one or more waveguide "pipes" or may be formed form a plate-light light guide layer that extends continuously under the leather.

The transparent portions of the leather may be used to illuminate a symbol (e.g., a glyph a logo, or other symbol) or may be used to illuminate other patterns or shapes. Waveguides that provide light to the leather may be in the shape of the desired symbol or may have other suitable shapes. Waveguides may be embedded in the leather or may be attached to a lower surface of the leather.

DETAILED DESCRIPTION

Figure 1:
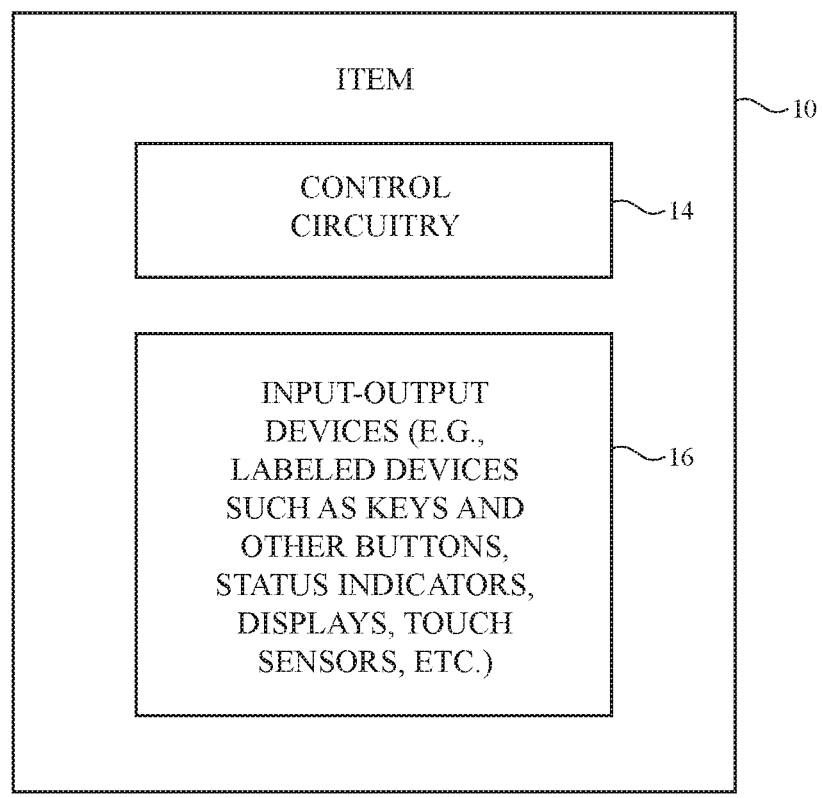
FIG. 1 is a schematic diagram of an illustrative leather-based item with circuitry in accordance with an embodiment.

Leather and other materials may be used in forming leather-based items. For example, leather may be used in forming portions of a stand-alone electronic device such as a cellular telephone, tablet computer, wrist-watch device, laptop computer, media player, pendant device, a device embedded in eyeglasses or other equipment worn on a user's head, or other electronic equipment, may be used in forming a strap, a case, a cover, or other accessory for an electronic device (e.g., a cover or other accessory that includes a keyboard), may be used in forming accessories such as headphones, may be used in forming straps, pockets, walls in a bag, or parts of other enclosures, may be used in forming seating or other furniture for a home or office, may be used in forming a seat, dashboard, steering wheel, seatbelt, or other item in a vehicle, may be used in forming part of an embedded system such as a system in which leather-based equipment is mounted in a kiosk, may be used in forming wearable items such as a necklace, wrist band, arm band, shoe, or other item of clothing, may be used in forming a wallet or purse, may be used in forming cushions, blankets, or other household items, may be used in forming toys, may be used in forming other equipment with circuitry, or may be used in forming structures that implement the functionality of two or more of these items.

Items such as these may include circuitry for supporting input-output features and other functionality. In some configurations, the circuitry may contain a light source for generating light that is viewable by a user of the item. The light may be used as general purpose illumination (e.g., light to illuminate an interior portion of a bag or other enclosure), may be used as light that illuminates a user's ambient environment (as with a flashlight), may be used to illuminate a symbol, or other patterned structure on the surface of a keyboard or other item (e.g., a keyboard key label), may serve as backlight illumination or per-pixel illumination for a display having an array of individually adjustable pixels, may provide illumination for a status indicator (e.g., a one-element or multi-element battery strength indicator, a wireless signal strength indicator, a power status indicator, or other symbol for a status indicator), may support wireless light-based communications (e.g., with external equipment), and/or may be used in other light-based applications. Arrangements in which the circuitry of an item includes one or more light sources for providing illumination for a patterned opening in a leather-based item such as a symbol (glyph) on a keyboard key (e.g., a keyboard key label or other label, etc.) or other pattern may sometimes be described herein as an example. This is, however, merely illustrative. Arrangements in which the light source structures are included in the circuitry of other types of items (e.g., other suitable structures having illuminated symbols and other patterns) and in which other types of illumination are generated may be used, if desired.

An illustrative arrangement for an item that includes circuitry with one or more light sources is shown in FIG. 1. As shown in FIG. 1, item 10 may be a leather-based item (as an example). The leather of item 10 may form all or part of a housing wall for item 10, may form internal structures for item 10, may form surface structures for item 10, or may form other leather-based structures. The leather of item 10 may be soft (e.g., item 10 may have a leather surface that yields to a light touch), may have a rigid feel (e.g., the surface of item 10 may be formed from a stiff leather), may be coarse, may be smooth, may have ribs or other patterned textures, and/or may be formed as part of a structure that has portions formed from non-leather materials such as plastic, metal, glass, crystalline materials, ceramics, or other materials.

Item 10 may have control circuitry 14. Control circuitry 14 may include storage and processing circuitry for supporting the operation of item 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 14 may be used to control the operation of item 10. The processing circuitry may be based on one or more microprocessors, microcontrollers, digital signal processors, baseband processors and other wireless communications circuits, power management units, audio chips, application specific integrated circuits, etc.

Input-output circuitry in item 10 such as input-output devices 16 may be used to allow data to be supplied to item 10 and to allow data to be provided from item 10 to external devices. During operation, control circuitry 14 may use input-output devices 16 to gather input from a user, external equipment, and/or the environment around item 10. Control circuitry 14 may also use input-output devices 16 to provide output to a user or external equipment.

Input-output devices 16 may include switches, buttons, joysticks, scrolling wheels, touch pads, key pads, keyboards, microphones, speakers, tone generators, vibrators, cameras, sensors such as touch sensors, capacitive proximity sensors, light-based proximity sensors, ambient light sensors, compasses, gyroscopes, accelerometers, moisture sensors, force sensors, data ports, displays, and other input-output devices. Keys, buttons, status indicators, displays, trim structures, and other portions of item 16 may be illuminated. For example, light-emitting diodes, lamps, electroluminescent panels, or other sources of light may be used in illuminating patterned openings. The patterned openings may pass through leather in item 10 and/or other layers of material and may form symbols (e.g., letters and other alphanumeric characters, icons, etc.) or other illuminated shapes. The symbols or other patterned openings may form labels on keys, buttons, or other input-output devices, may form labels on other illuminated structures, may form trim for a component (e.g., a halo surrounding a key), or may form other suitable illuminated area. Arrangements in which patterned openings or other transparent structures in one or more leather layers in item 10 are used in forming illuminated letters or other symbols that serve as labels for input-output components such as keys and buttons may sometimes be described herein as an example. In general, however, input-output devices 16 may include one or more light sources that provide any suitable type of illumination for a user of item 10.

Figure 2:
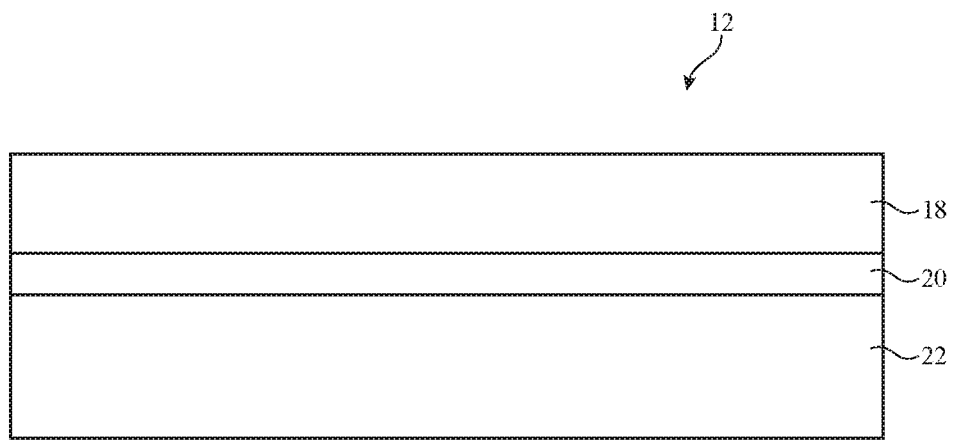
FIG. 2 is a cross-sectional side view of illustrative leather in accordance with an embodiment.

A cross-sectional side view of an illustrative layer of leather for item 10 is shown in FIG. 2. As shown in FIG. 2, leather 12 may include multiple layers. The outer layer of leather 12 such as layer 18 is sometimes referred to as the grain. The inner layer of leather 12 such as layer 22 is sometimes referred to as the corium. Grain layer 18 may be darker and smoother than corium layer 22, whereas corium layer 22 may be fleshier than grain layer 18. The fibers that make up leather 12 may be thin, flexible, and loosely packed in corium layer 22 and may become more tightly packed and stiff as they move up toward grain layer 18. Layer 20 may be the junction of grain and corium (e.g., a transition layer that includes some tightly packed grain fibers and some loosely packed corium fibers).

Figure 3:
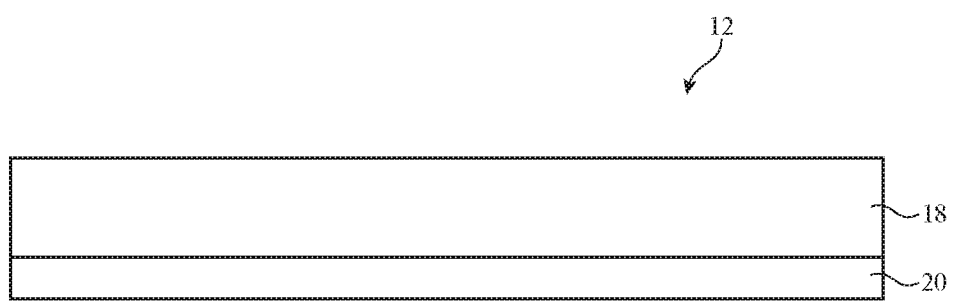
FIG. 3 is a cross-sectional side view of illustrative leather that has been thinned in accordance with an embodiment.

If desired, the thickness of leather 12 may be reduced by removing some of grain layer 18 and/or corium layer 22 (e.g., using skiving equipment or other equipment). FIG. 3 is a cross-sectional side view of leather 12 in which corium layer 22 has been removed. Leather 12 may be skived uniformly across the length of leather 12 or local skiving may be used to thin localized portions of leather 12. If desired, the top part of grain layer 18 may be buffed off (e.g., sanded and finished). This type of leather is sometimes referred to as top-grain leather. This is, however, merely illustrative. If desired, leather 12 may be full-grain leather in which grain layer 18 is left intact without any buffing or sanding. Arrangements in which artificial grain is applied to grain layer 18 may also be used. In general, any suitable grade or type of leather may be used in item 10 of FIG. 1 (top-grain, full-grain, split leather, suede, nubuck, bonded leather, artificial leather, etc.).

Figure 4:
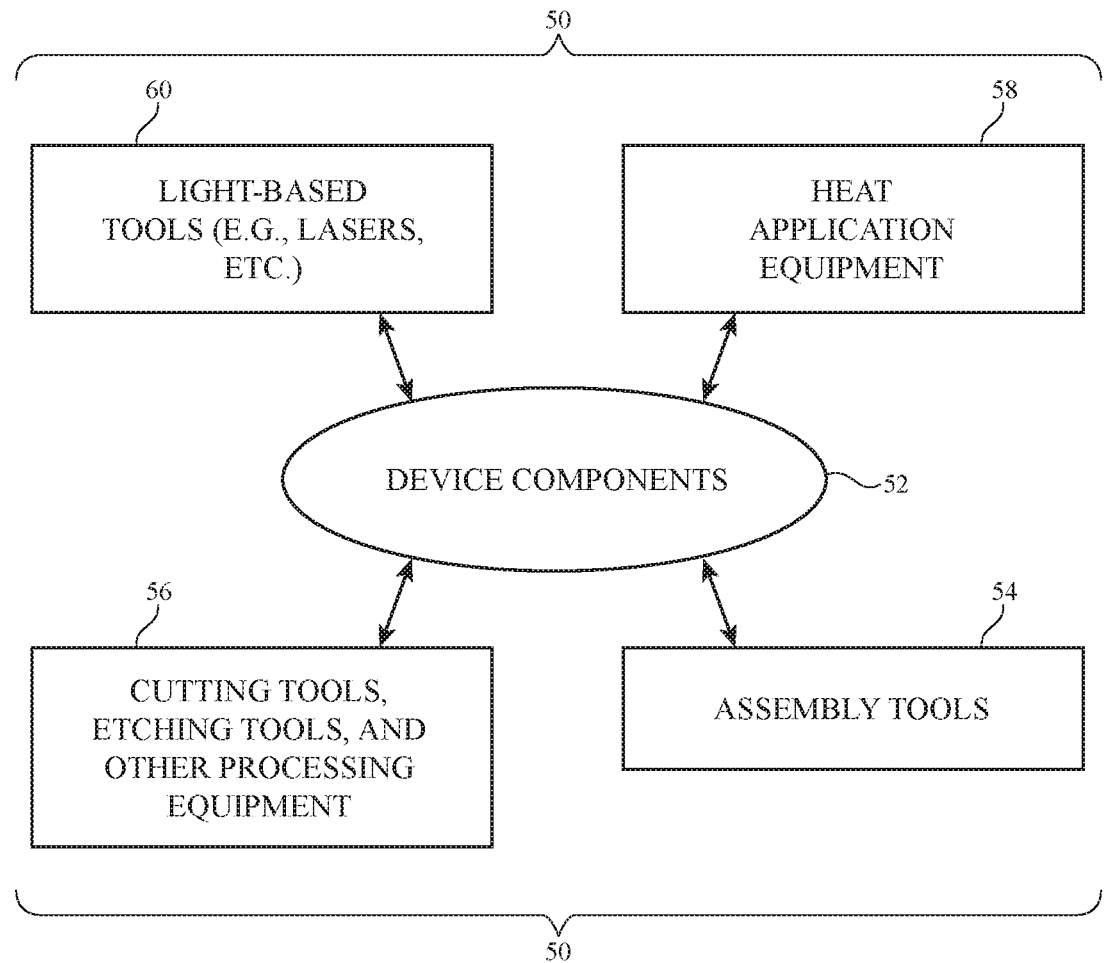
FIG. 4 is a diagram of illustrative equipment of the type that may be used in processing structures for an electronic device in accordance with an embodiment.

As shown in FIG. 4, structures 52 (e.g., device components, partly assembled devices such as leather 12 and other structures, and/or fully assembled devices 10) may be processed using equipment 50.

Equipment 50 may include equipment for applying heat to structures 52 such as equipment 58. Equipment 58 may include a hot tool or other tool that produces heat to soften, melt, cure, or otherwise modify structures 52. A hot tool may include a heated metal member that can be placed into contact with a portion of structures 52. Heated embossing equipment (e.g., heated metal die structures that can be used to emboss a desired pattern onto a layer of leather or other material that is compressed between the die structures) and/or other heated structures may be included in equipment 50.

Light-based tools 60 may also be used to process structures 52. Tools 60 may include sources of light such as lasers, light-emitting diodes, and lamps. Tools 60 may emit ultraviolet light, visible light, and/or infrared light. The light emitted by tools 60 may include wide area illumination and/or focused beams. Light may be emitted continuously (e.g., using a continuous wave laser) or may be emitted in pulses (e.g., to perform laser ablation operations). Tools 60 may emit laser pulses having durations of $10^{-15}$-$10^{-12}$ seconds, $10^{-15}$-$10^{-9}$ seconds, longer than one picosecond, shorter than one picosecond, longer than one nanosecond, shorter than one nanosecond, between one femtosecond and one millisecond, or other suitable durations. Short pulses may have high energy densities and may be suitable for ablating (vaporizing) leather fibers, polymers, and other materials without melting nearby structures. Short pulses, longer duration pulses, and/or continuous wave light beams may be used in softening and/or melting leather fibers, polymers, and other materials.

If desired structures 52 may be processed using additional tools 56 such as cutting tools (e.g., a skiving machine, a milling machine, drill, grinding equipment, etc.), molding tools (e.g., leather shaping and molding equipment), polishing equipment, tumbling equipment (e.g., equipment for softening leather), chemical baths (e.g., for etching, for electroplating, for modifying the surfaces of structures 52, etc.), printing equipment (e.g., screen printing tools, inkjet printing tools, etc.), photolithographic tools, ovens, and/or other equipment for processing structures 52.

Assembly tools 54 may be used in attaching components together to form assemblies and may be used in joining components and/or assemblies to form finished devices. Assembly tools 54 may include manually controlled tools and computer-controlled robotic assembly equipment.

To allow light to pass through leather 12 in item 10, leather 12 and/or other layers of material in item 10 may be provided with transparent portions. The transparent portions may be formed from air-filled openings in leather 12, may be formed from openings in leather 12 that are filled with transparent material (e.g., haze-free clear material or hazy translucent material), or may be formed from other structures that allow light to pass. In some configurations, an opaque leather coating or other opaque layer may be provided with one or more openings in addition to or instead of providing leather 12 with patterned openings. Combinations of these approaches and/or other arrangements for providing illuminated structures in item 10 may be used, if desired.

Figure 5:
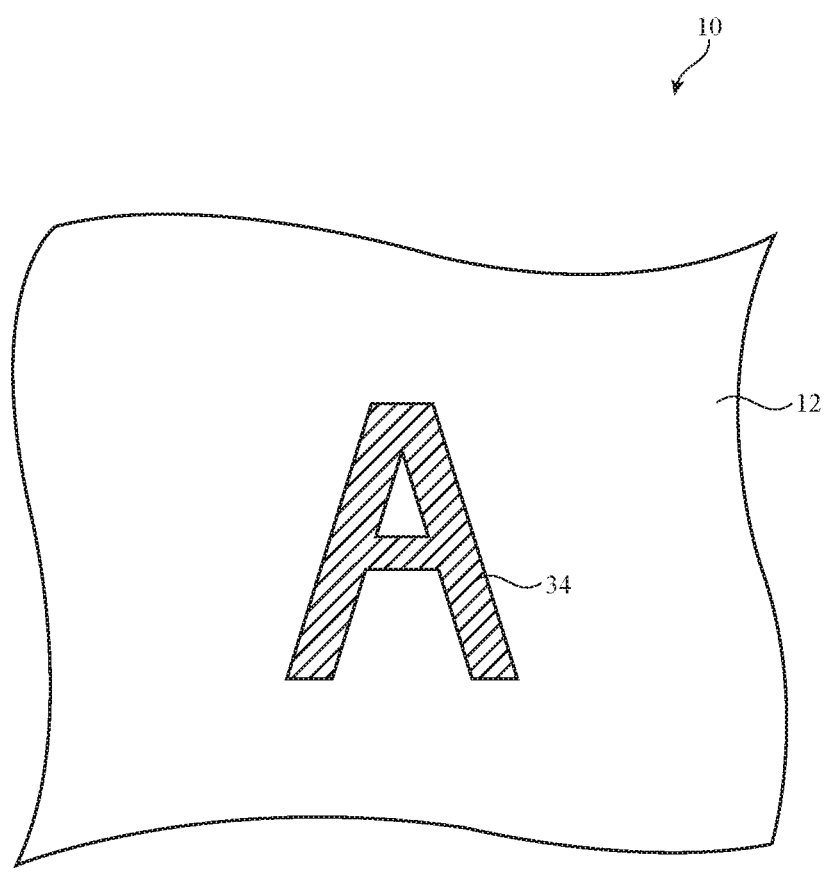
FIG. 5 is a top view of an illustrative leather structure with an illuminated portion such as an illuminated symbol in accordance with an embodiment.

FIG. 5 is a top view of an illustrative transparent portion 34 of leather 12. Transparent portion 34 may be fully transparent or semi-transparent so that light from a light-source can pass through leather 12. Leather 12 may overlap an input-output component such as a key in a keyboard in item 10 (e.g., item 10 may be an accessory such as a cover that contains a keyboard or other device that contains keys). Transparent portion 34 of leather 12 may form a symbol or other pattern. In the example of FIG. 5, transparent portion 34 has the shape of the letter "A" and may form a label for the "A" key in a keyboard. This is, however, merely illustrative. If desired, transparent portion 34 of leather 12 may form illuminated regions of other shapes and patterns and may be used in other types of electronic devices. Transparent region 34 may have any suitable size and shape, may be formed on any suitable portion of item 10, may form labels, symbols, text, decorative patterns (e.g., trim), parts of status indicators, parts of displays, parts of buttons (e.g., buttons such as power buttons, volume buttons, sleep/wake buttons, and other buttons besides the keys in a keyboard), may be formed on surfaces of item 10 that are not associated with keys or buttons, etc. The illuminated key configuration of FIG. 5 is merely an example.

Figure 6:
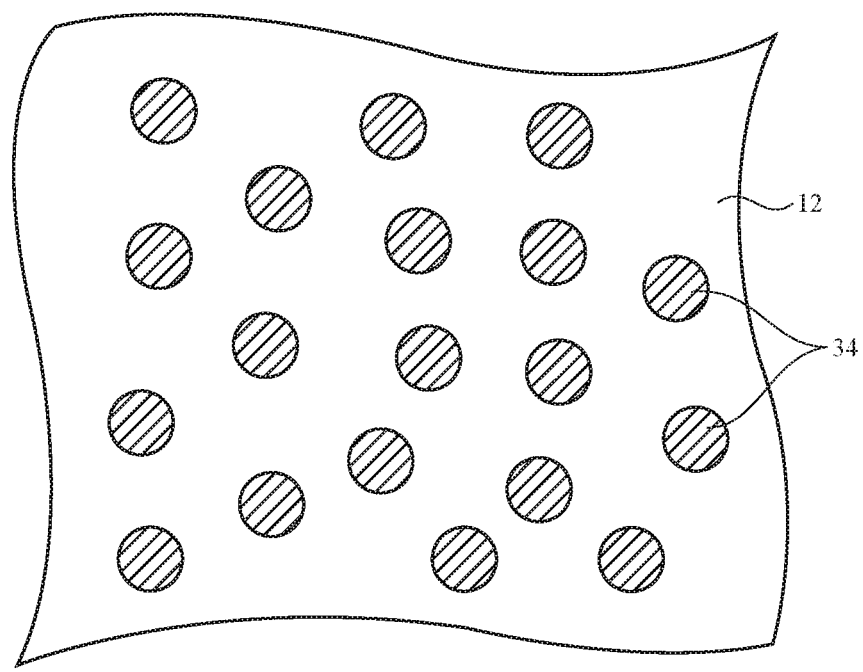
FIG. 6 is a top view of an illustrative leather structure with an array of small illuminated regions that are arranged to form a symbol or other desired shape in accordance with an embodiment.

Illuminable portions of leather 12 may be formed from one or more larger (e.g., symbol-sized) continuous transparent regions 34, as shown in the example of FIG. 5, or may be formed from a set of smaller transparent regions 34, as shown in the example of FIG. 6. Transparent regions 34 of FIG. 6 may be arranged together to form a symbol or other desired shape. Transparent regions 34 of FIG. 6 may be closely-packed and may have relatively small dimensions. The size and spacing of transparent regions 34 of FIG. 6 may, for example, be small enough that the human eye cannot distinguish individual transparent regions 34 (e.g., separate transparent regions 34 may give the appearance of a single continuous transparent region of the type shown in FIG. 5). When transparent regions 34 are not illuminated, transparent regions 34 may blend in with the surrounding leather 12 and the human eye may be unable to detect regions 34 at all. If desired, transparent region 34 of FIG. 5 may also be configured to blend in with surrounding leather 12 when not illuminated.

Figure 7:
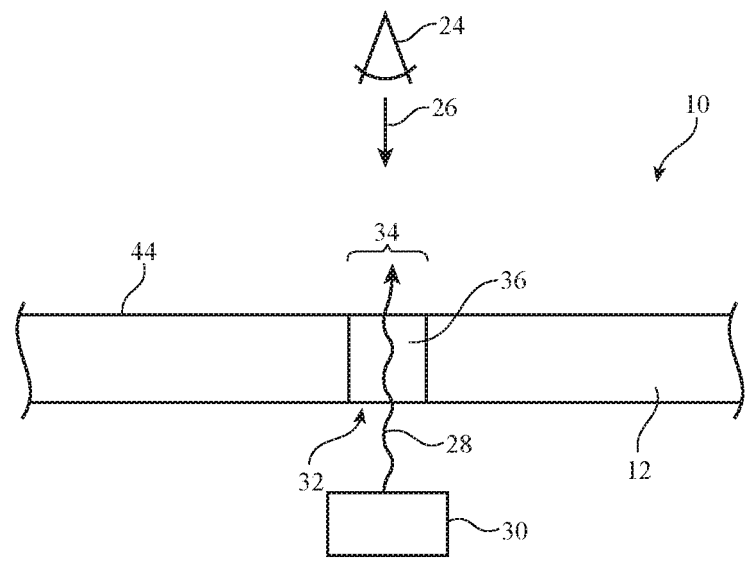
FIG. 7 is a cross-sectional side view of an illustrative layer of leather with an illuminated region formed from an opening in the leather in accordance with an embodiment.

A side view of illustrative leather having a transparent region of the type shown in FIGS. 5 and 6 is shown in FIG. 7. As shown in FIG. 7, a viewer such as viewer 24 may view exterior surface 44 of item 10 in direction 26. Item 10 may include a layer material such as leather 12 that forms outer surface 44. A light source such as light source 30 may be formed in the interior of item 10. Light source 30 may be formed from one or more light-emitting diodes (e.g., organic light-emitting diodes, light-emitting diode dies formed from crystalline semiconductor, quantum dot light-emitting diodes, etc.), may be formed from one or more lamps, may be formed from one or more electroluminescent panels, may be formed from diode lasers or other laser light sources, or may be formed from other suitable light generating devices. Light source 30 may generate light at visible wavelengths, infrared wavelengths, and/or ultraviolet wavelengths. For example, light source 30 may generate visible light illumination 28.

In the example of FIG. 7, transparent portion 34 of leather 12 is formed from one or more openings such as opening 32. Opening 32 (or a set of openings such as opening 32) may have the shape of an alphanumeric character or other symbol (glyph), may serve as a label for a component or other label or trim, may have the shape of a logo, or may have any other suitable shape. As shown in FIG. 7, opening 32 of transparent region 34 (i.e., the symbol, label, or other patterned structure formed from opening 32 or set of openings 32) may be illuminated with illumination 28 (i.e., illumination 28 may serve as backlight for opening 32). Because opening 32 may have a shape that forms a symbol or other desired pattern, openings such as opening 32 of FIG. 7 may sometimes be referred to as patterned openings.

Openings such as opening 32 of FIG. 7 may be formed by stamping (punching), cutting, machining, plasma cutting, waterjet cutting, heating, ablation, chemical removal (e.g., chemical etching techniques, etc.), laser-based techniques (sometimes referred to as laser hole formation or laser drilling), and/or other suitable material removal techniques.

Opening 32 may be filled with transparent material 36 (e.g., material through which light 28 may pass from light source 30). The transparent material may be formed from a haze-free clear material (e.g., air or a clear material such as plastic, glass, sapphire or other crystalline materials, etc., with a haze value that is sufficiently low to appear clear and haze-free to the naked eye) or may be formed from translucent material (e.g., a hazy transparent polymer that includes light-scattering particles such as particles of white inorganic materials, light scattering particles of other colors, or other attributes that contribute to a hazy, translucent appearance). If desired, openings 32 may be filled with other leather material (e.g., leather scraps, leather fiber, bonded leather, artificial leather, and/or other leather material) or may be filled with filler material that is doped with phosphor material that emits light in response to being excited by light from light source 30.

If desired, the body of an illuminated shape (e.g., the illustrative "A" symbol of FIG. 5) can be filled with an array of perforations 32 or can be filled entirely from a single opening 32. In general, illuminated patterns in item 10 may have contiguous large illuminated openings (e.g., symbol-sized opening for forming a symbol that is entirely illuminated, etc.) and/or may have symbol-sized portions filled with arrays of smaller perforations or sets of perforations that run along the edges of the patterns. The width of a portion of a character (e.g., the letter "A") or other symbol may be, for example, 0.1 to 0.5 mm, more than 0.2 mm, more than 0.3 mm, less than 1 mm, less than 5 mm, or other suitable size. The diameter of perforations such as perforations 32 may be 40 microns, 30-60 microns, more than 25 microns, more than 35 microns, more than 50 microns, 50-100 microns, 5-50 microns, less than 200 microns, more than 100 microns, or other suitable diameter. Perforations 32 may have circular shapes or may have other shapes. In configurations in which perforations 32 are arranged in an array to provide a symbol or other pattern with illumination, perforations 32 may be spaced apart from each other by 150 microns, by 100-150 microns, by 50-300 microns, by more than 25 microns, by less than 400 microns, or by other suitable amounts.

If desired, openings 32 may be formed using a cutting tool, may be formed by chemical etching, or may be formed using a laser tool such as laser tool 60 of FIG. 4. Laser tool 60 may be a pulsed laser, a continuous wave laser, an infrared laser, a visible-light laser, or an ultraviolet laser. Laser tool 60 may include focusing optics to focus a laser beam from a laser to a small spot (e.g., a spot having a diameter of 1-100 microns, less than 10 microns, more than 5 microns, etc.). During operations with laser tool 60, a symbol-shaped opening 32 and/or an array of smaller perforations 32 having the shape of a symbol (e.g., a solidly filled symbol or a symbol in which perforations 32 are arranged along the symbol edges) may be formed to allow illumination 28 to pass through leather 12. One or more pulses of light from laser tool 60 may be used in drilling each perforation or other opening in leather 12.

In arrangements where a laser is used to form openings 32, a shielding spacer or stencil having openings may be placed between leather 12 and the laser. The laser may be used to ablate the portions of leather 12 that are exposed through the shielding spacer or stencil.

Figure 8:
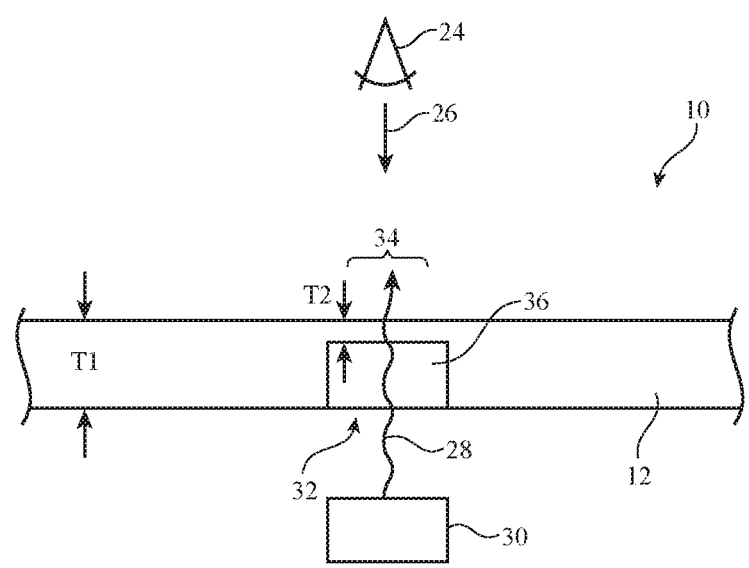
FIG. 8 is a cross-sectional side view of an illustrative layer of leather with an illuminated region formed from thinned portion of the leather in accordance with an embodiment.

Laser-drilled openings may pass fully or part way through one or more leather layers and/or one or more non-leather layers. FIG. 8 shows an illustrative example in which opening 32 does not pass all the way through leather 12. Laser tool 60 of FIG. 4 may be used to create openings 32 that pass only partially through layer 12 so that thickness T1 of leather 12 is reduced to thickness T2 in transparent region 34. Thickness T2 of leather 12 in regions 34 may be sufficiently small that light 28 from light source 30 can pass through leather 12 towards viewer 24.

Material 36 may be formed in openings 32 using any suitable method. If desired, an autoclave or pressure-based system may be used to fill openings 32 with material 36 to provide an even fill in opening 32 and minimize voids in material 36. The viscosity of material 36 can be tuned (i.e., adjusted) to achieve the desired fill result of material 36 in openings 32. In another suitable arrangement, material 36 may be formed in openings 32 using in-mold decorating techniques.

Figure 9:
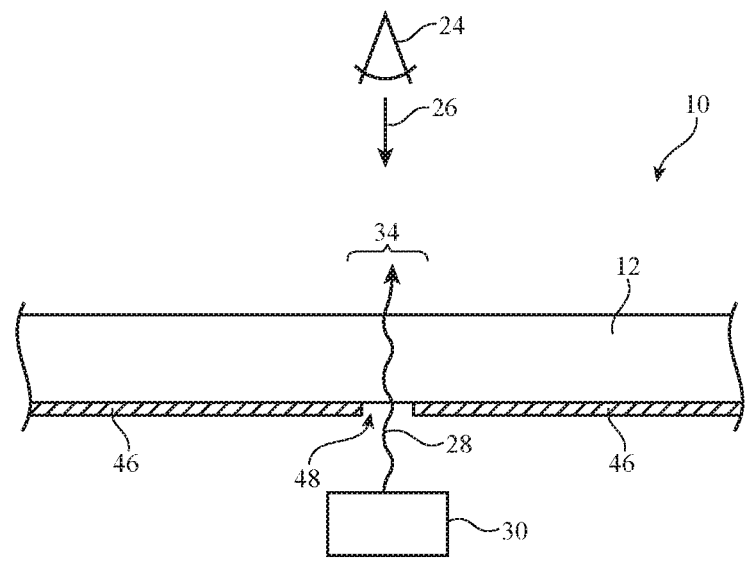
FIG. 9 is a cross-sectional side view of an illustrative layer of leather with an illuminated region formed from openings in an opaque layer on the layer of leather in accordance with an embodiment.

In the example of FIG. 9, leather 12 is thin enough to be transparent or semi-transparent. To create the desired shape of illuminated region 34, one or more opaque layers such as opaque layer 46 may be formed leather 12. Opaque layer 46 may have openings 48 to allow light 28 to pass through leather 12. In regions where opaque layer 46 is present, light 28 is blocked and leather 12 will be dark in appearance. Opening 48 may be a symbol-sized continuous opening in the desired shape or may be one of an array of openings that are arranged inside of the desired shape. Opaque layer 46 may be formed on the upper and/or lower surface of leather 12.

In some arrangements, opaque layer 46 may be a surface of leather 12 that has been dyed, tanned, or otherwise treated to be opaque. In other arrangements, opaque layer 46 may be a separate layer that is formed on leather 12. For example, layer 46 may be an opaque layer of material such as a polymer layer, metal layer, or other layer of material. As an example, layer 46 may be formed from an opaque polymer layer such as a layer of black ink (e.g., a polymer binder containing black particles of material such as particles of carbon black, etc.) or a polymer containing other opaque materials. Layer 46 may be deposited by printing techniques (e.g., screen printing, pad printing, inkjet printing, etc.) or other suitable deposition techniques. Layer 46 may be deposited as a coating on leather 12, may be attached to leather 12 by a layer of adhesive, and/or may be mounted within item 10 adjacent to leather 12 without attaching layer 46 directly to leather 12.

Figure 10:
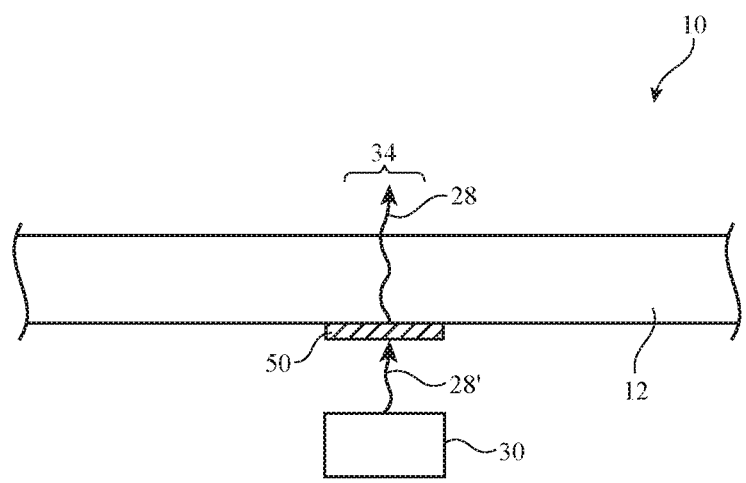
FIG. 10 is a cross-sectional side view of an illustrative layer of leather with an illuminated region formed from a light-sensitive coating on the leather in accordance with an embodiment.

In the example of FIG. 10, leather 12 is also thin enough to be transparent or semi-transparent. To create the desired shape of illuminated region 34, one or more light-sensitive coatings such as light-sensitive coating 50 may be formed on leather 12. Light source 30 may produce light 28' that causes coating 50 to emit light 28. Light source 30 may, for example, be an ultraviolet light source that produces ultraviolet light 28'. Coating 50 may be a fluorescent or phosphorescent paint that emits visible light 28 when exposed to ultraviolet light 28'. Since ultraviolet light 28' is invisible to the human eye, viewer 24 may only be able to see visible light 28 in regions where coating 50 is located. Thus, regions without coating 50 may be dark in appearance, whereas regions with coating 50 may be illuminated when light source 30 is turned on. Coating 50 may have any desired pattern or shape depending on the desired pattern or shape of illuminable region 34. Coating 50 may be deposited by printing techniques (e.g., screen printing, pad printing, inkjet printing, etc.) or other suitable deposition techniques.

Figure 11:
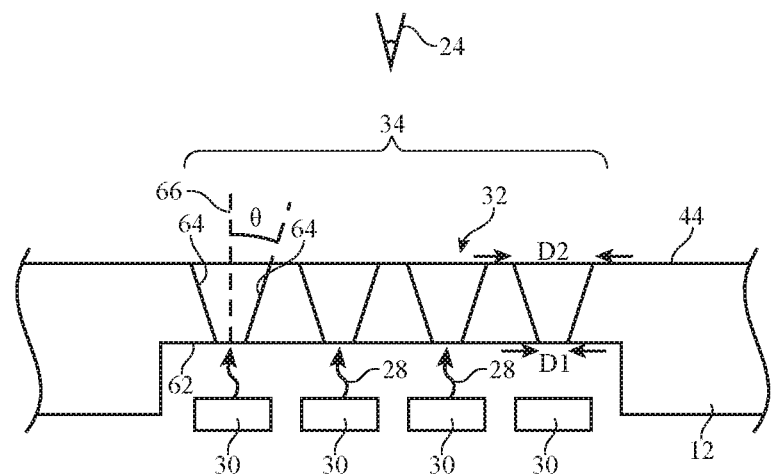
FIG. 11 is a cross-sectional side view of an illustrative layer of leather with an illuminated region formed from an array of tapered openings in the leather in accordance with an embodiment.

FIG. 11 shows an illustrative arrangement in which an array of openings 32 is formed in a thinned region of leather 12. In the example of FIG. 11, openings 32 are tapered. Openings 32 may have diameter D1 at inner surface 62 of leather 12 and diameter D2 at outer surface 44 of leather 12. D2 may be larger than D1, as shown in FIG. 11, or D2 may be smaller than D1. Each opening 32 may be illuminated by an associated light source 30, as shown in FIG. 11, or one light source 30 may be used to illuminate two or more openings 32. Light sources 30 may all be the same color or light sources 30 may include different color light sources (e.g., a red light source, a green light source, a blue light source, a white light source, and/or light sources of other colors).

Each opening 32 may be surrounded by walls 64 of leather material. Walls 64 may be sloped at an angle θ relative to optical axis 66 of openings 32 (e.g., an axis that is perpendicular to outer surface 44 of leather 12). The angle θ at which walls 64 are sloped relative to axis 66 may be adjusted to achieve the desired viewing angle (e.g., the angle at which viewer 24 can see light 28 passing through openings 32). A larger angle θ will yield a larger viewing angle, whereas a smaller angle θ will yield a smaller viewing angle. If desired, all openings 32 in region 34 may have the same angle θ or some openings 32 in region 34 may have one angle θ and other openings 32 in region 34 may have a different angle θ.

Figure 12:
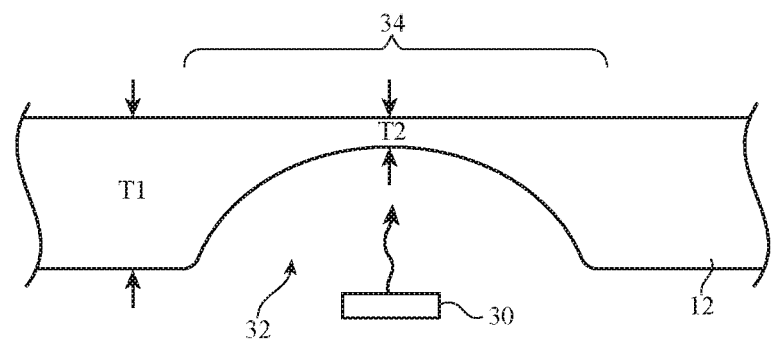
FIG. 12 is a cross-sectional side view of an illustrative layer of leather with an illuminated region formed from a gradually thinned portion of the leather in accordance with an embodiment.

In the example of FIG. 12, openings 32 is formed from a gradual thinning of leather 12 in region 34. In other words, the thickness of leather 12 may transition gradually from larger thickness T1 outside of region 34 to smaller thickness T2 inside of region 34. This type of gradient thickness may produce illuminated regions 34 with softer edges. In other words, rather than changing abruptly from a fully illuminated region 34 to a fully opaque region, the amount of light transmitted through region 34 may be greatest at the thinnest point (at thickness T2) and may gradually decrease until little to no light is transmitted outside of region 34 (at thickness T1).

Figure 13:
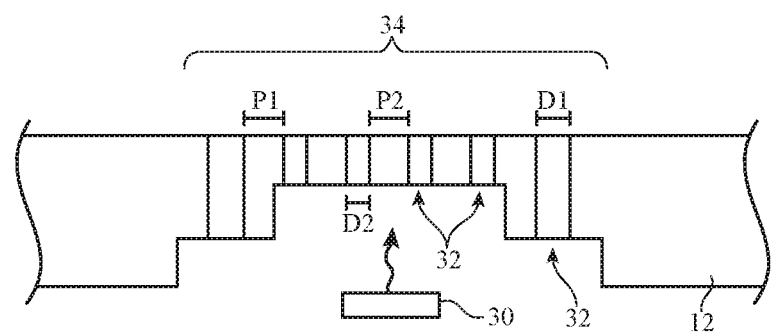
FIG. 13 is a cross-sectional side view of an illustrative layer of leather with an illuminated region formed from an array of openings with varied spacing and varied diameters in accordance with an embodiment.

FIG. 13 shows how the spacing and diameter of openings 32 may be adjusted to achieve a desired illumination effect in region 34. Some openings 32 may be spaced apart at distance P1, while other openings 32 may be spaced apart at distance P2 (e.g., a distance less than P1). Some openings 32 may have diameter D1, while other openings 32 may have diameter D2 (e.g., a smaller diameter than D1). This is, however, merely illustrative. In general, any suitable property associated with openings 32 may be varied to achieve the desired illumination effect (e.g., the thickness of layer 12, the diameter of openings 32, the spacing or pitch of openings 32, the color of light 28 emitted through openings 32, the angle θ at which walls around openings 32 are sloped relative to optical axis 66, etc.). Properties such as leather thickness and the taper/slope of walls around openings 32 may determine how light 28 is guided through leather 12 and the angle at which it exits leather 12.

Figure 14:
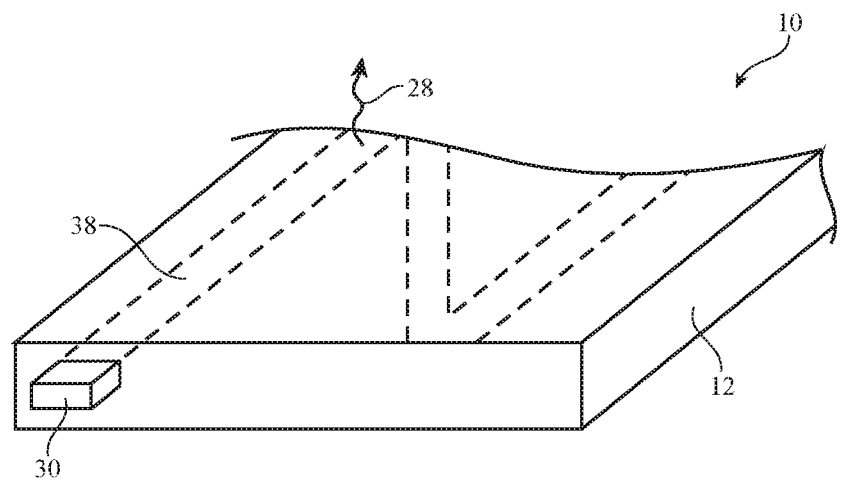
FIG. 14 is a perspective view of an illustrative layer of leather with an illuminated region formed from a waveguide in the leather in accordance with an embodiment.

If desired, illuminated symbols and other illuminated shapes may be formed in leather 12 using transparent material that serves as an optical waveguide. Consider, as an example, the arrangement of FIG. 14. As shown in FIG. 14, transparent material that forms one or more waveguides such as waveguides 38 (sometimes referred to as an optical fiber) may be incorporated into selected areas of leather 12. Waveguides 38 may be formed from glass, clear polymer, or other transparent material. Light source 30 (e.g., a light-emitting diode, etc.) may emit light that is coupled into the ends of one or more of waveguides 38. Due to the principle of total internal reflection, light 28 from light source 30 may be confined within waveguide 38 and may be distributed throughout waveguide 38.

Waveguides 38 may be incorporated into leather 12 in a pattern associated with a symbol, label, or other desired pattern or shape (e.g., the illustrative character "N" in the example of FIG. 14). Waveguides 38 may have roughened surfaces, gratings, or other light scattering features to promote the extraction of the light from waveguides 38 that has been emitted into waveguides 38 by light source 30. The incorporation of light scattering features into appropriate portions of waveguides 38 ensures that waveguides 38 will emit light outwardly from leather 12. If desired, an illuminated symbol may be formed by providing waveguides 38 with light scattering features in selected portions of leather 12 and/or by covering certain portions of waveguides 38 with an opaque layer material (opaque portions of leather 12 or other material) while forming patterned openings in the opaque layer of material to form the symbol. If desired, waveguides (optical fibers) may be used in distributing light 28 from light source 30 to openings 32 in leather 12. For example, a light-distributing layer including waveguides 38 may serve as a backlight layer for an overlapping opaque leather layer with openings and/or patterned transparent leather regions, etc.

Figure 15:
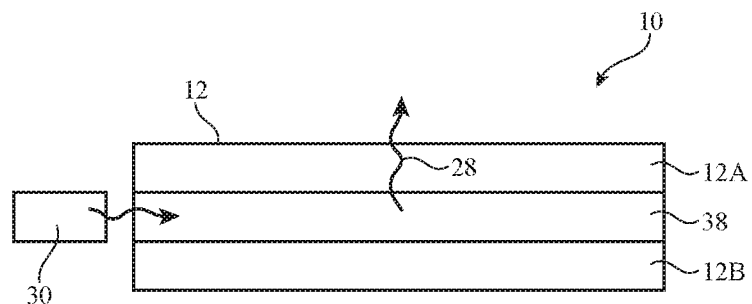
FIG. 15 is a cross-sectional side view of an illustrative layer of leather with an illuminated region formed from a waveguide in the leather in accordance with an embodiment.

FIG. 15 shows how waveguide 38 may be embedded in leather 12. For example, waveguide 38 may be interposed between upper portion 12A of leather 12 and lower portion 12B of leather 12. This type of configuration may be achieved by splitting a single piece of leather 12 into two layers (e.g., layer 12A and 12B) and attaching each layer to a respective side of waveguides 38 or by attaching two separate pieces of leather to respectively form layer 12A and layer 12B.

Figure 16:
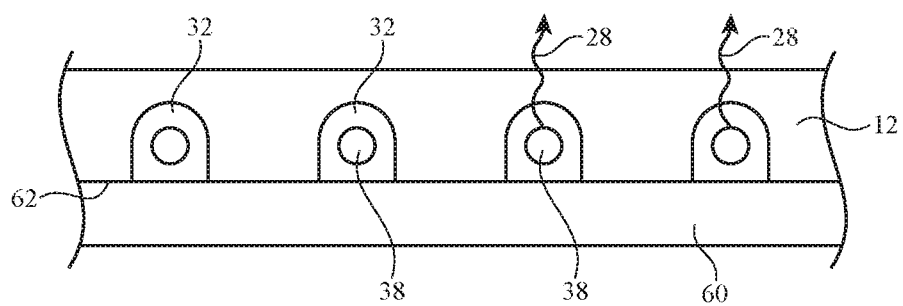
FIG. 16 is a cross-sectional side view of an illustrative layer of leather with an illuminated region formed from waveguides that are located in respective openings in the leather in accordance with an embodiment.

If desired, waveguides 38 may be located in openings or recesses in leather 12, as shown in FIG. 16. In the example of FIG. 16, leather 12 includes openings 32 in which waveguides 38 are located. Each waveguide 38 may guide light to a respective portion of leather 12. The extraction features of waveguides 38 may cause light 28 to exit waveguides 38 and pass through thinned portions of leather 12 (e.g., the thinned portions created by openings 32). An additional layer such as layer 60 may be attached to inner surface 62 of leather 12. Layer 60 may be an additional layer of leather, may be a fabric layer, may be a layer of coating, or may be any other suitable layer (e.g., a layer of polymer, metal, glass, etc.).

Figure 17:
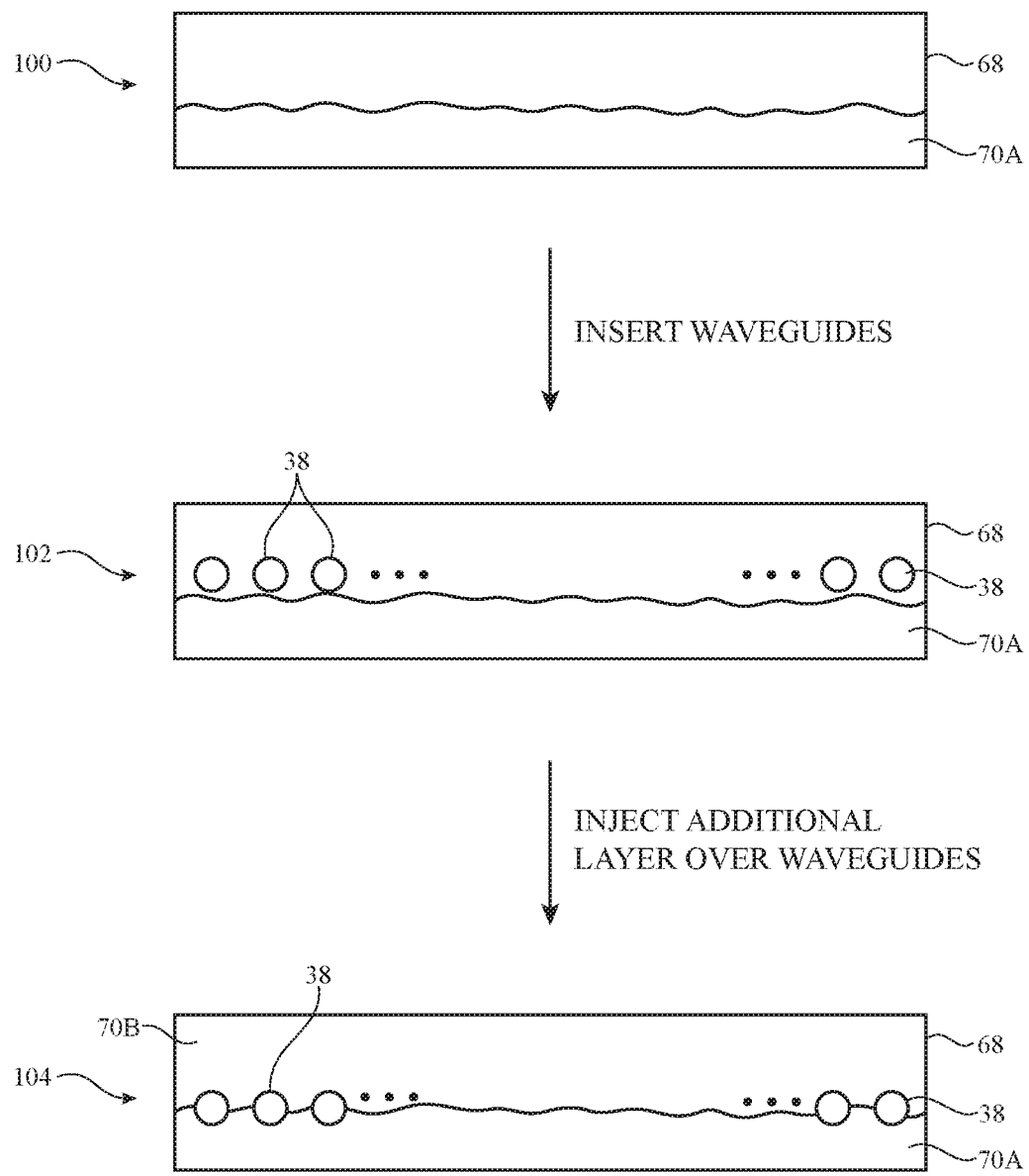
FIG. 17 is a diagram of illustrative steps involved in embedded waveguides in a layer of lab-grown leather in accordance with an embodiment.

FIG. 17 illustrates a method of embedding waveguides in lab-grown leather. At step 100, a layer of animal skin cells 70A may be placed in container 68. In some arrangements, layer 70A may be isolated cells that multiply in container 68, thereby producing connective tissue (e.g., collagen) between cells. In other arrangements, layer 70A may be a pre-formed sheet of cells and connective tissue.

At step 102, waveguides 38 may be placed in container 68 over layer 70A. The example of FIG. 17 in which a set of waveguides 38 are placed in container 68 is merely illustrative. If desired, only one waveguide may be placed in container 68 or a plate-like light guide layer (rather than a fiber-like waveguide) may be placed in container 68.

At step 104, one or more additional layers of animal skin cells such as layer 70B may be placed over waveguides 38. The cells of layer 70B may be isolated cells that multiply and grow and produce collagen in container 68 or the cells of layer 70B may have been previously grown in a cell culture medium and may be in sheet-form when placed in container 68. Layers 70A and 70B may mature together (e.g., connective tissue may form between the cells of layer 70A and the cells of layer 70B) to form a multi-layer leather material in which waveguides 38 are embedded.

Figure 18:
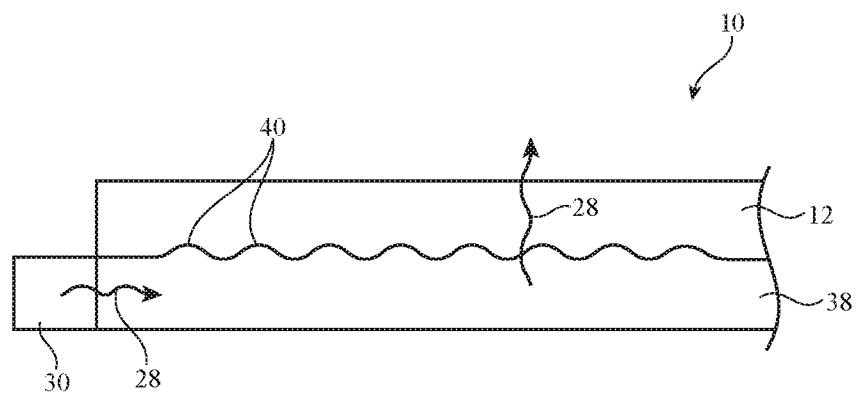
FIG. 18 is a cross-sectional side view of an illustrative layer of leather with an illuminated region formed using a light guide layer with protruding light extraction features in accordance with an embodiment.

If desired, waveguides 38 may be formed as a single continuous light guide layer rather than individual light guide "pipes" of the type shown in FIG. 16. For example, as shown in FIG. 18, light guide 38 may be a plate-like layer that extends continuously underneath leather layer 12. This type of arrangement may help add structure to leather 12 after leather 12 has been thinned (e.g., skived). For example, if care is not taken, leather that has been sliced very thinly can be flimsy and can lose the characteristic look and feel of leather. The addition of a compliant light guide layer 38 (e.g., a thin layer of polymer or other clear material such as polydimethylsiloxane or other clear silicone) may help add heft to leather 12 while still allowing leather 12 to be flexible and soft. This is, however, merely illustrative. If desired, light guide layer 38 may be stiff and rigid.

Light guide layer 38 may be attached to leather 12 with adhesive or other suitable attachment means. Light guiding layer 38 may receive light 28 from one or more light sources 30 (e.g., light-emitting diodes) and may guide light 28 via total internal reflection. Light extraction features 40 may cause light to scatter and escape through the upper surface of light guide layer 38 to leather 12.

Figure 19:
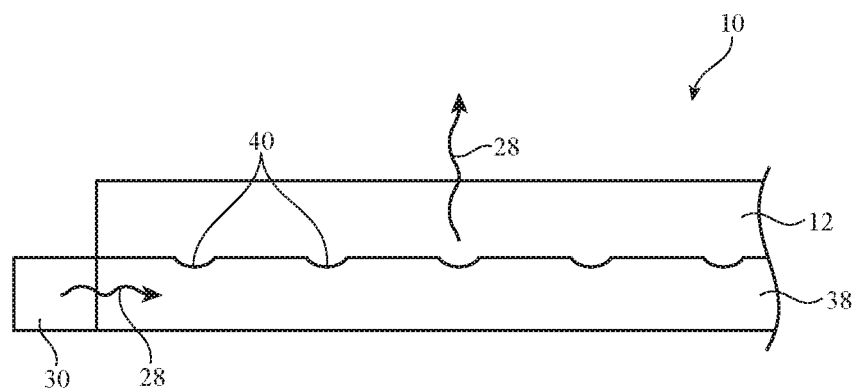
FIG. 19 is a cross-sectional side view of an illustrative layer of leather with an illuminated region formed using a light guide layer with recessed light extraction features in accordance with an embodiment.
Figure 20:
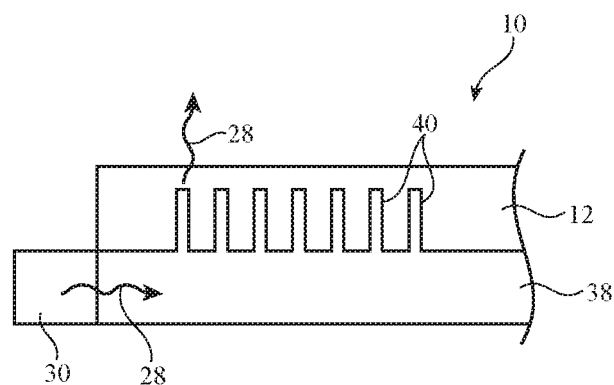
FIG. 20 is a cross-sectional side view of an illustrative layer of leather with an illuminated region formed using a light guide layer with light extraction features that protrude into the leather in accordance with an embodiment.

In the example of FIG. 18, light extraction features 40 on waveguides 38 are formed from protrusions on the upper surface of waveguides 38. FIG. 19 shows how light extraction features 40 on light guide layer 38 may be formed form pits or recesses in the upper surface of light guide layer 38. In the example of FIG. 20, light extraction features 40 are formed from protruding portions of light guide layer 38 that extend into leather layer 12. This type of protruding element 40 can help localize light in certain regions of layer 12. If desired, the size, shape, spacing, or other property of light extraction features 40 may be varied along the length of waveguide 38 to produce uniform light extraction along the length of waveguide 38.

Figure 21:
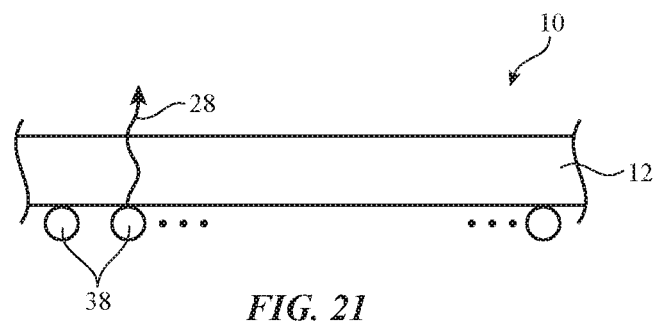
FIG. 21 is a cross-sectional side view of an illustrative layer of leather with an illuminated region formed using multiple individual waveguides that are attached to the lower surface of the leather in accordance with an embodiment of the present invention.

If desired, individual waveguides 38 may be attached to a lower surface of leather 12 and may be used to provide leather 12 with structure while allowing leather 12 to remain compliant. For example, as shown in FIG. 21, waveguides 38 may be attached to a lower surface of leather 12 and may direct light 28 upwards through leather 12. Waveguides 38 may be rigid or flexible. In arrangements where waveguides 38 are rigid, leather 12 may be stiff in locations that overlap waveguides 38 and may be flexible and bendable in regions that do not overlap waveguides 38 (e.g., in the areas between waveguides 38). In arrangements where waveguides 38 are flexible, the presence of waveguides 38 may provide some structure and support for leather 12 while still allowing leather 12 to bend and flex in different directions.

Figure 22:
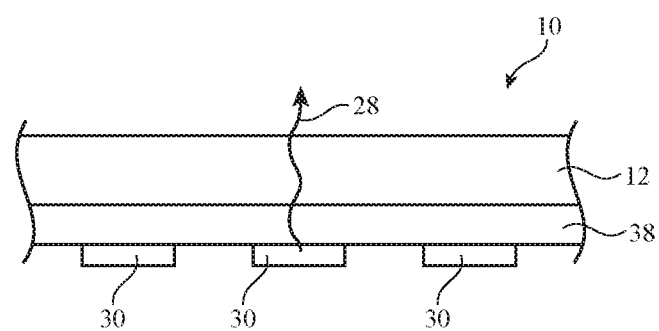
FIG. 22 is a cross-sectional side view of an illustrative layer of leather with an illuminated region formed using a light guide layer and top-firing light-emitting diodes in accordance with an embodiment.

In the example of FIG. 22, light sources 30 have been attached to the lower surface of light guide 38 (e.g., a fiber-like waveguide, a plate-like light guide layer, or other light guiding/diffusing element). Light sources 30 may, for example, be top-firing light-emitting diodes (e.g., crystalline semiconductor light-emitting diodes, sometimes referred to as micro-LEDs, or other suitable light-emitting diodes). Light sources 30 may emit light 28 into light guide 38, which may diffuse light 28 and guide light 28 out of layer 38 towards leather 12. If desired, layer 38 may be used purely as a diffuser and may not be used to guide light via total internal reflection.

Figure 23:
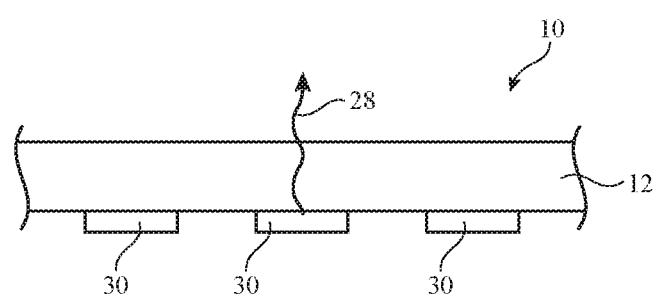
FIG. 23 is a cross-sectional side view of an illustrative layer of leather with an illuminated region formed using top-firing light-emitting diodes that are attached to the lower surface of the leather in accordance with an embodiment.

In the example of FIG. 23, light sources 30 have been attached to the lower surface of leather 12. Light sources 30 may be top-firing light-emitting diodes (e.g., micro-LEDs) that emit light 28 directly through leather 12. The proximity of light source 30 to leather 12 may help ensure that more of light 28 is transmitted through leather 12.

Figure 24:
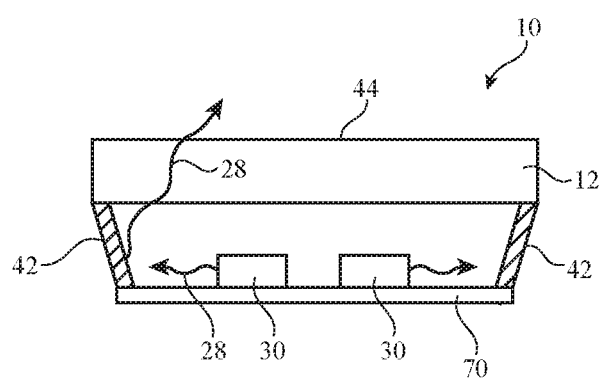
FIG. 24 is a cross-sectional side view of an illustrative layer of leather with an illuminated region formed using side-firing light-emitting diodes that emit light towards a reflective surface that reflects the light towards the leather in accordance with an embodiment.

In the example of FIG. 24, light sources 30 are side-firing light-emitting diodes (e.g., micro-LEDs) that emit light 28 in a direction parallel to outer surface 44 of leather 12. Light sources 30 may be mounted in a housing 70 having one or more reflective surfaces 42 (e.g., a sidewall with a reflective coating of metal or other material or a sidewall formed from reflective material such as metal). Light 28 from light sources 30 may reflect off of reflective surfaces 42, which may be angled towards leather 12 so that light 28 is redirected through leather 12. If desired, light sources 30 may be ultraviolet light sources and surfaces 42 may be covered with a ultraviolet-light-sensitive coating that produces visible light when exposed to ultraviolet light from light sources 30.

The foregoing is merely illustrative and various modifications can be made by those skilled in the art without departing from the scope and spirit of the described embodiments. The foregoing embodiments may be implemented individually or in any combination.

What is claimed is:

1. An item, comprising:
   leather having a first region with a first thickness and a second region with a second thickness that is less than the first thickness;
   a light guide attached to the leather; and
   a light source coupled to the light guide, wherein the light guide receives light from the light source and guides the light through the light guide, wherein the light guide has light extraction features that cause the light to escape the light guide and pass through the second region of the leather.

2. The item defined in claim 1 wherein the light guide is flexible.

3. The item defined in claim 1 wherein the light extraction features protrude into the leather.

4. An item, comprising:
   leather;
   a light guide attached to the leather; and
   a light source coupled to the light guide, wherein the light guide receives light from the light source and guides the light through the light guide, wherein the light guide has light extraction features that cause the light to escape the light guide and pass through the leather, wherein the light guide comprises an elongated waveguide having a shape, and wherein the light that passes through the leather forms an illuminated symbol that matches the shape of the waveguide.

5. The item defined in claim 4 wherein the waveguide is embedded in the leather.

6. A cover for an electronic device, comprising:
   leather having an array of openings, wherein the openings are arranged to form a symbol, wherein the openings are filled with a material that is at least partially transparent, and wherein the openings pass only partially through the leather; and
   a light source that emits light through the array of openings, wherein the light illuminates the symbol.

7. The cover defined in claim 6 wherein the openings are tapered.

8. The cover defined in claim 6 wherein the light source comprises an array of light-emitting diodes.

9. The cover defined in claim 6 wherein the leather comprises skived leather from which corium has been removed.

10. The cover defined in claim 6 further comprising a waveguide that receives the light from the light source and that guides the light towards the leather.

11. The cover defined in claim 6 wherein the material comprises a filler material doped with phosphor material.

12. The cover defined in claim 11 wherein the phosphor material emits light in response to being illuminated with the light from the light source.

13. A cover for an electronic device having an input-output device, comprising:
    leather;
    light-transmissive portions in the leather, wherein the light-transmissive portions are arranged to form an alphanumeric symbol that overlaps the input-output device; and
    a light source that emits light through the light-transmissive portions.

14. The cover defined in claim 13 wherein the light-transmissive portions are formed from openings in the leather.

15. The cover defined in claim 13 further comprising an opaque layer interposed between the leather and the light source, wherein the light-transmissive portions of the leather overlap openings in the opaque layer.

16. The cover defined in claim 13 further comprising a light-sensitive coating on the leather, wherein the light-sensitive coating emits light when illuminated with the light from the light source.

17. The cover defined in claim 16 wherein the light source comprises an ultraviolet light source and the light-sensitive coating comprises a material that emits visible light when illuminated with ultraviolet light.

\* \* \* \* \*